United States Patent Office 3,796,713
Patented Mar. 12, 1974

3,796,713
4-ACETYL[1,2-a]PYRIMIDO-(1,4)-BENZO-
DIAZEPINES
Michael Edward Derieg, Caldwell, Rodney Ian Fryer,
North Caldwell, and Leo Henryk Sternbach, Upper
Montclair, N.J., assignors to Hoffmann-La Roche Inc.,
Nutley, N.J.
No Drawing. Filed Dec. 20, 1971, Ser. No. 210,253
Int. Cl. C07d 51/42
U.S. Cl. 260—256.4 F   3 Claims

ABSTRACT OF THE DISCLOSURE

Novel 1H - 1,4 - benzodiazepine derivatives bearing between the 1,2-positions a 5- or 6-membered heterocyclic ring possessing two nitrogen atoms are disclosed. These 1,2-heterocyclic-1H-1,4-benzodiazepines are useful as muscle relaxant, anti-convulsant and sedative agents.

DETAILED DESCRIPTION OF THE INVENTION

The present invention relates to 1,2-heterocyclic-1H-1,4-benzodiazepines. More particularly, the invention concerns 1,4-benzodiazepines which bear a 5- or 6-membered heterocyclic ring between positions 1- and 2- and a —C=C— grouping in positions 2-3. The invention further comprehends processes for making these novel benzodiazepines.

More specifically, the compounds of the present invention are selected from the group consisting of compounds of the general formula

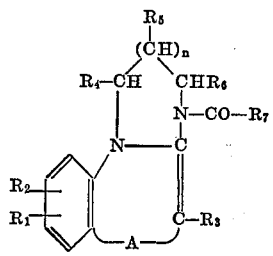

(I)

wherein A is selected from the group consisting of

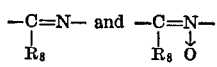

$n$ is the integer 0 or 1; $R_1$ and $R_2$ are selected from the group consisting of halogen, hydrogen, trifluoromethyl, nitro, lower alkyl, and cyano; $R_3$–$R_6$ are each selected from the group consisting of hydrogen and lower alkyl; $R_7$ signifies lower alkyl and $R_8$ is selected from the group consisting of pyridyl, phenyl or halophenyl.

As used herein, the term "lower alkyl" refers to straight and branched chain hydrocarbon groups containing from 1 to 4 carbon atoms such as, for example, methyl, ethyl, propyl, isopropyl, butyl and the like. The term "halogen" refers to all four forms thereof, i.e., bromine, chlorine, fluorine and iodine. When the $R_8$ substituent is pyridyl, the 2-pyridyl group is preferred. When the $R_8$ substituent is a halophenyl group, the o-halophenyl group is preferred.

A preferred class of compounds falling within the scope of Formula I above are those wherein $R_1$ signifies nitro or halogen, preferably chlorine, and is located in the 7-position of the basic benzodiazepine molecule, $R_2$ is hydrogen, A is the group

wherein $R_8'$ is phenyl or halophenyl, i.e., compounds of the formula

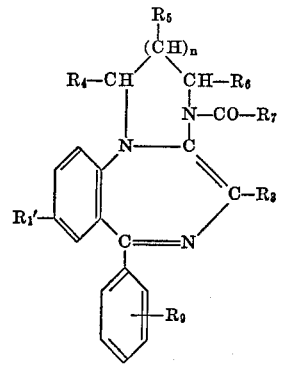

(Ia)

wherein $R_1'$ is nitro or halogen, preferably chlorine; $R_9$ is hydrogen or halogen, preferably chlorine or fluorine; $n$ and $R_3$–$R_7$ are as described above.

Another preferred class of compounds falling within the scope of Formula I above are those wherein $R_1$ is nitro or halogen, preferably chlorine, and is located in the 7-position of the basic benzodiazepine molecule, $R_2$–$R_6$ are hydrogen, and A is the group

wherein $R_8'$ is phenyl or halophenyl, i.e., compounds of the formula

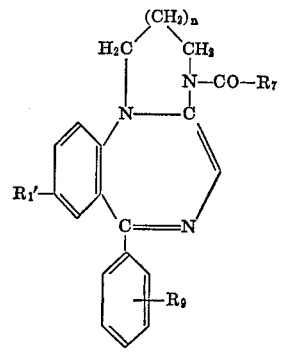

(Ib)

wherein $R_1'$, $R_7$, $R_9$ and $n$ are as described above.

The most preferred compounds of Formula I above are:
3-acetyl-8-chloro-6-(2-fluorophenyl)-2,3-dihydro-1H-imidazo[1,2-a][1,4]benzodiazepine;
4-acetyl-9-chloro-7-(2-fluorophenyl)-1,2,3,4-tetrahydropyrimido(1,2-a)(1,4)benzodiazepine;
4-acetyl-9-chloro-1,2,3,4-tetrahydro-7-phenylpyrimido (1,2-a)(1,4)benzodiazepine.

The compounds of Formula I above may be prepared by reacting a compound of the formula

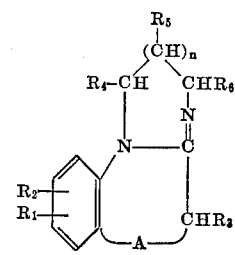

(II)

wherein $R_1$–$R_6$, A and $n$ are as described above with an acid anhydride of a carboxylic acid having from 2–5 carbon atoms.

Examples of acid anhydrides that can be employed in the preparation of the desired end products of Formula I include acetic anhydride, propionic anhydride, butyric anhydride and the like.

The reaction between the compound of Formula II and the acid anhydride may be effected in the presence of an inert organic solvent; suitable solvents for this purpose include aromatic hydrocarbons such as benzene, toluene and the like, chlorinated hydrocarbons such as chloroform, methylene chloride and the like, and dimethylformamide (DMF). When the A substituent in the starting material of Formula II is a

group, $R_8$ defined as above, the reaction between this Formula II compound and the acid anhydride can be conducted at a temperature in the range of from about 0° C. to the reflux temperature of the reaction medium. If in the starting material of Formula II the A substituent is a

group, $R_8$ defined as above, then the reaction can be conducted at a temperature in the range of about 0° C. to room temperature. In either case, the reaction between the Formula II compound and the acid anhydride is preferably conducted at room temperature. Pressure is not critical to this reaction and thus for the sake of convenience the reaction is effected at atmospheric pressure.

The starting materials of Formula II above are known compounds or can be prepared in analogy to the preparation of the known compounds.

The compounds of Formula I above are useful as anticonvulsants, muscle relaxants and sedatives. Thus these compounds can be used as medicaments. For example, they can be used in the form of pharmaceutical preparations which contain them in admixture with a pharmaceutical, organic or inorganic carrier material which is suitable for enteral or parenteral application such as, for example, gelatin, lactose, starches, magnesium stearate, talc, vegetable oils, gum arabic, polyalkylene glycols, Vaseline, etc. The pharmaceutical preparations can be prepared in solid form (e.g., as tablets, dragées, suppositories, capsules) or in liquid form (e.g., as solutions, suspensions or emulsions). They can also contain other therapeutically valuable substances.

The compounds of Formula I above can be administered at dosages adjusted to individual requirements and fitted to the pharmaceutical exigencies of the situation. Convenient pharmaceutical dosages are in the range of from about 2 mg. to about 200 mg. per day.

The useful anti-convulsant activity of the compounds of this invention is shown in warm-blooded animals utilizing the standard antimetrazole test. In the antimetrazole test, a compound is administered orally to groups of four mice at various dose levels. One hour later, metrazole is administered subcutaneously and the animals are observed for protection from convulsive seizures. Results are recorded as the number of animals protected against convulsions. The dose at which 50% of the animals are protected from convulsive seizes is expressed as the $ED_{50}$. Following these test procedures, compounds such as 4-acetyl-9-chloro-1,2,3,4-tetrahydro-7-phenylpyrimido-(1,2-a)(1,4)benzodiazepine and 3-acetyl-8-chloro-6-(2-fluorophenyl) - 2,3 - dihydro - 1H - imidazo[1,2 - a][1,4]benzodiazepine show an $ED_{50}$ of 93.0±6.74 and 3.1±0.3 mg./kg. respectively, indicating that these compounds exhibit anticonvulsant activity.

The sedative and muscle relaxant activity of the compounds of the invention is shown using the standard foot shock test. In this test, a pair of mice is confined under a one liter beaker placed on a grid which presents shock to the feet. At least 5 fighting episodes are elicited in a 2-minute period. Pairs of mice are marked and pretreated 1 hour prior to a second shocking. Logarithmic dose intervals are utilized up to a maximum of 10 mg./kg. At the 100 percent blocking dose 3 out of 3 pairs must be blocked from fighting. The measurements are made at the dose level at which 100% blocking is observed and the results are expressed as the dose in mg./kg. which block the fighting response for one hour. Following these test procedures, 4-acetyl-9-chloro-7-(2-fluorophenyl) - 1,2,3,4-tetrahydropyrimido[1,2-a][1,4]benzodiazepine exhibited a $PD_{50}$ of 20 mg./kg. and 3-acetyl-8-chloro-6-(2-fluorophenyl)-2,3-dihydro-1H-imidazo[1,2 - a][1,4]benzodiazepine exhibited a $PD_{50}$ of 10 mg./kg.

The following examples are illustrative of the present invention. All temperatures given are in degrees centigrade.

EXAMPLE 1

Preparation of 3-acetyl-8-chloro-6-(2-fluorophenyl)-2,3-dihydro-1H-imidazo[1,2-a][1,4]benzodiazepine A solution of 1 g. (3.2 mmol) of 8-chloro-6-(2-fluorophenyl)-1,2-dihydro - 4H - imidazo[1,2-a][1,4]benzodiazepine in 10 ml. of acetic anhydride was stirred for 2 hours at room temperature. The red precipitate was separated by filtration and the damp solid was stored over night under reduced pressure to remove the solvent. The above-named product was obtained as a red crystalline solid, M.P. 166–169°.

EXAMPLE 2

Preparation of 4-acetyl-9-chloro-1,2,3,4-tetrahydro-7-phenylpyrimido[1,2-a][1,4]benzodiazepine A solution of 25 ml. of acetic anhydride and 5.0 (16.1 mmol) of 9 - chloro - 1,2,3,5 - tetrahydro - 7 - phenylpyrido[3,2-a][1,4]benzodiazepine was stirred for 15 minutes by which time a bright orange solid had formed. The above-named product was obtained by filtration in crystalline form, M.P. 211–215°. Recrystallization from chloroform/hexane gave orange prisms, M.P. 224–225°.

EXAMPLE 3

Preparation of 4-acetyl-9-chloro-7-(2-fluorophenyl)-1,2, 3,4-tetrahydropyrimido[1,2-a][1,4]benzodiazepine A solution of 5 ml. of acetic anhydride and 0.5 g. (1.5 mmol) of 9-chloro-7-(2-fluorophenyl) - 1,2,3,5 - tetrahydropyrimido[1,2-a][1,4]benzodiazepine was stirred for 90 minutes and the above-named product was removed as an orange solid by filtration. Recrystallization from ether/hexane gave orange prisms, M.P. 188–190°.

EXAMPLE 4

4-acetyl-9-chloro-7-(2-fluorophenyl)-1,2,3,4-tetrahydropyrimido(1,2-a)(1,4)benzodiazepine

SUPPOSITORY FORMULATION

| | Per 1.3 gm. suppository, gm. |
|---|---|
| 4-acetyl - 9 - chloro-7-(2-fluorophenyl) - 1,2,3,4-tetrahydropyrimido(1,2-a)(1,4)benzodiazepine | 0.010 |
| Wecobee M [1] | 1.245 |
| Carnauba wax | 0.045 |

[1] E. F. Drew Company, 522 5th Avenue, New York, N.Y.

Procedure (1) The Wecobee M and the carnauba wax were melted in a suitable size glass-lined container (stainless steel may also be used), mixed well and cooled to 45° C.

(2) The 4-acetyl-9-chloro-7-(2 - fluorophenyl) - 1,2,3, 4-tetrahydropyrimido(1,2 - a)(1,4)benzodiazepine which has been reduced to a fine powder with no lumps, was added and stirred until completely and uniformly dispersed.

(3) The mixture was poured into suppository molds to yield suppositories having an individual weight of 1.3 grams.

(4) The suppositories were cooled and removed from molds. They were then individually wrapped in wax paper for packaging (foil may also be used).

EXAMPLE 5

4-acetyl-9-chloro-7-(2-fluorophenyl)-1,2,3,4-tetrahydropyrimido(1,2-a)(1,4)benzodiazepine

CAPSULE FORMULATION

| | Per capsule, mg. |
|---|---|
| 4-acetyl - 9 - chloro - 7 - (2 - fluorophenyl)-1,2,34-tetrahydropyrimido(1,2-a)(1,4)benzodiazepine | 10 |
| Lactose, U.S.P. | 165 |
| Corn starch, U.S.P. | 30 |
| Talc, U.S.P. | 5 |
| Total weight | 210 |

Procedure (1) 4-acetyl - 9 - chloro-7-(2 - fluorophenyl)-1,2,3,4-tetrahydropyrimido(1,2 - a)(1,4)benzodiazepine, lactose and corn starch were mixed in a suitable manner.

(2) The mixture was further blended by passing through a Fitzpatrick Comminuting Machine with a #1A screen with knives forward.

(3) The blended powder was returned to the mixer, the talc added and blended thoroughly.

(4) The mixture was filled into #4 hard shell gelatin capsules on a Parke Davis capsulating machine. (Any similar type capsulating machine may be used.)

EXAMPLE 6

4-acetyl-9-chloro-7-(2-fluorophenyl)-1,2,3,4-tetrahydropyrimido(1,2-a)(1,4)benzodiazepine

TABLET FORMULATION

| | Per tablet, mg. |
|---|---|
| 4-acetyl - 9 - chloro-7-(2-fluorophenyl) - 1,2,3,4-tetrahydropyrimido(1,2-a)(1,4)benzodiazepine | 25.00 |
| Dicalcium phosphate dihydrate, unmilled | 175.00 |
| Corn starch | 24.00 |
| Magnesium stearate | 1.00 |
| Total weight | 225.00 |

Procedure (1) 4-acetyl - 9 - chloro-7-(2-fluorophenyl) - 1,2,3,4-tetrahydropyrimido(1,2-a)(1,4)benzodiazepine and corn starch were mixed together and passed through a #00 screen in Model "J" Fitzmill with hammers forward.

(2) This premix was then mixed with dicalcium phosphate and one-half of the magnesium stearate, passed through a #1A screen in Model "J" Fitzmill with knives forward, and slugged.

(3) The slugs were passed through a #2A plate in a Model "D" Fitzmill at slow speed with knives forward, and the remaining magnesium stearate was added.

(4) The mixture was mixed and compressed.

We claim:

1. A compound of the formula

[Structure: benzodiazepine compound with substituents $R_3$, $R_4$, $R_5$, $R_6$, $R_9$, halogen, and N—CO—lower alkyl group]

wherein $R_3$–$R_6$ are each hydrogen; $R_9$ is hydrogen or halogen; and lower alkyl is alkyl of one to four carbon atoms.

2. The compound of claim 1 wherein the halogen group is chlorine, $R_3$–$R_6$ are hydrogen, the lower alkyl group is methyl, i.e., 4-acetyl-9-chloro-1,2,3,4-tetrahydro-7-phenylpyrimido (1,2-a)(1,4)-benzodiazepine.

3. The compound of claim 1 wherein the halogen group is chlorine, $R_3$–$R_6$ are hydrogen, the lower alkyl group is methyl, i.e. 4-acetyl-9-chloro-7-(2-fluoro-phenyl) - 1,2,3,4-tetrahydropyrimido (1,2-a)(1,4)-benzodiazepine.

References Cited

UNITED STATES PATENTS

| 3,734,912 | 5/1973 | Hanze | 260—256.5 R |
| 3,651,046 | 3/1972 | Derieg et al. | 260—239.3 |

OTHER REFERENCES

Derieg et al.: J. Med. Chem., 1968, 11(4), 912–13 (Eng.).

Chemical Abstract, 69:36092V (1968).

Derieg et al.: Chem. Abstracts 70:87862Z (1969).

DONALD G. DAUS, Primary Examiner

R. D. McCLOUD, Assistant Examiner

U.S. Cl. X.R.

260—309.7; 424—251, 269

UNITED STATES PATENT OFFICE
CERTIFICATE OF CORRECTION

Patent No. 3,796,713    Dated 3/12/74

Inventor(s) Michael E. Derieg, Rodney I. Fryer and Leo H. Sternbach

It is certified that error appears in the above-identified patent and that said Letters Patent are hereby corrected as shown below:

Page 1, column 1 of Letters Patent -- The title
"4-Acetyl[1,2-a]Pyrimido-(1,4)-Benzodiazepines"

should be

4-Acetyl-(1,2-a)Pyrimido-(1,4)-Benzodiazepines

Signed and sealed this 22nd day of April 1975.

(SEAL)
Attest:

RUTH C. MASON
Attesting Officer

C. MARSHALL DANN
Commissioner of Patents
and Trademarks